(12) United States Patent
Lidbrink

(10) Patent No.: US 7,593,734 B2
(45) Date of Patent: Sep. 22, 2009

(54) METHOD AND AN APPARATUS FOR CELL PLANNING

(75) Inventor: Stefan Lidbrink, Hägersten (SE)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 419 days.

(21) Appl. No.: 10/556,710

(22) PCT Filed: May 24, 2004

(86) PCT No.: PCT/SE2004/000809

§ 371 (c)(1),
(2), (4) Date: Nov. 11, 2005

(87) PCT Pub. No.: WO2004/105419

PCT Pub. Date: Dec. 2, 2004

(65) Prior Publication Data

US 2007/0117565 A1   May 24, 2007

(30) Foreign Application Priority Data

May 23, 2003   (SE)   .................................... 0301532

(51) Int. Cl.
*H04Q 7/20* (2006.01)
(52) U.S. Cl. ...................... 455/446; 455/449
(58) Field of Classification Search ................ 455/449, 455/574, 525; 370/344
See application file for complete search history.

(56) References Cited

U.S. PATENT DOCUMENTS

| | | | |
|---|---|---|---|
| 5,561,839 A | 10/1996 | Osterberg et al. | |
| 2003/0013452 A1* | 1/2003 | Hunt et al. | 455/449 |
| 2003/0054843 A1 | 3/2003 | Notani et al. | |

OTHER PUBLICATIONS

Irons, S et al., Supporting the Successful Deployment of Third Generation Public Cellular Technologies—System Dimensioning and Network Planning. IN: 3G Mobile Communication Technologies, 2000. First Int Conf on (IEE Conf Publ No. 471) Publ Mar. 27-29, 2000, London, UK. pp. 156-160. Inspec AN: 6597953. See whole document.

Garg, V K et al, A Tool to Calculate Erlang Capacity of a BTS Supporting 3G UMTS System. IN: Personal Wireless Communications, 2000 IEEE Int Conf on, Publ Dec. 17-20, 2000, Hyderabad, India. pp. 173-177. Inspec AN: 6970405 pp. 173, 174, 176.

Turkboylari, M, Area Spectral Efficiency of Street Microcell Environment. In: Personal, Indoor and Mobile Radio Communications, 2000. PIMCR 2000. The 11th IEEE Int Symp on Publ Sep. 18-21, 2000, London, UK. pp. 1578-1582, vol. 2. Inspec AN: 6866695, Whole document.

Swedish Patent Office, International Search Report for PCT/SE2004/000809, dated Aug. 13, 2004.

* cited by examiner

*Primary Examiner*—Lester Kincaid
*Assistant Examiner*—Phuoc Doan
(74) *Attorney, Agent, or Firm*—Roger S. Burleigh

(57) ABSTRACT

Measuring in a cellular telecommunication system the position of active mobile stations and the service, in terms of bit rate, they use. The first figure shows a number of users, four black dots having a voice connection with low bit rate and two users O having packet switched connection with a much higher bit rate. In the second figure the bit rate used is taken into consideration and, as shown by the greater area of the packet switched users, a more true picture of the traffic density is created. If the cell tends to get overloaded, requiring a cell split, the site X of a new base station will be shifted to the right comparing the second figure with the first.

7 Claims, 3 Drawing Sheets

METHOD AND AN APPARATUS FOR CELL PLANNING

TECHNICAL FIELD

The invention relates to bandwidth related cell planning in a mobile telecommunication system.

BACKGROUND

When building a cellular system the first thing to focus on is to have sufficient number of base stations to create the wanted coverage area. When the intended area is covered and the traffic starts to grow the system has to be expanded in capacity. The first step in doing this is to add more transceiver units (TRUs) to the existing base stations and to re-use the frequencies in the system as tight as possible. Due to the fact that the frequency spectrum allowed to be used by each operator is limited, this adding of TRUs can only meet the increased capacity demand to a certain extent. In the longer run congestion in the system will occur and the perceived quality in the system will be too low. Then new smaller sites have to be built to take care of the increasing capacity; i.e. a so-called cell split is needed.

Now the question arises where to build the new site. Of course it shall be built as close as possible to where the traffic is generated in order to efficiently "off-load" the congested cells. Building the cell there will also give a system with higher quality since the calls will experience higher possible signal strength enabling enough margins to possible interfering calls. Collecting the position from different mobiles using position methods available in a mobile system e.g. cell ID/TA and E-OTD based on GPS and triangulation methods give the operator a hint of where the calls are made in the systems. Using this information the operator will have a decent view of where to build the new site. A method of determining traffic density within cells for a similar purpose based on power level and geographic distribution of the traffic is described in U.S. Pat. No. 5,828,962 assigned to France Telecom.

In modern 2,5G & 3G systems the users share resources from a common resource pool. In addition different user-services consume more or less of these common resources. For example in a WCDMA system the total power that can be transmitted in a cell is limited and a subscriber using the 384 kbps packet data service will consume much more power than a subscriber making a voice call, typically around 15 kbps or even less, from the same position.

If the 384 kbps user is close to the cell border almost all available power in the cell is needed to support that connection. But if the 384 kbps user is close to the site, thereby experiencing high signal strength, the power control algorithm will reduce the transmitted output power for this connection, which will free resources from the resource pool and make room for more users in the cell. This shows the necessity of locating the new site within an area, where many users of high bit-rate services, can be served as efficient as possible.

SUMMARY OF THE INVENTION

With this background in mind it is not sufficient to just use the positioning methods available as of today to get to know where the most efficient new site position will be. Also information about which service that is used is needed. As an example it could be likely in a certain area that the high bit rate packet services are used in offices, while voice calls are more common in streets and open areas. In other areas there might be a different pattern all dependant on the users behaviour.

The solution is to combine information of where the connection is made together with the service used. By performing a measurement of this at regular intervals a statistical picture can be created. This information can then be stored and displayed to the operator to be used to refine the network in order to optimise its performance.

It is thus an object of the invention to measure where the traffic is and the kind of traffic that is going on in the particular place.

Another object is to design a cell planning tool, which uses the measurement results to decide optimal sites for new base stations where such new sites are needed in order to avoid fatal congestion.

A further aspect of the invention is to use other parameters of the radio connection for the cell planning. One such parameter is the path loss of the channel allocated to the particular users. This parameter is position related, but also related to the environment of the users—high buildings and narrow streets give a high path loss, while open areas like big squares and fields give much lower losses.

The objects and aspects of the invention are accomplished by a method of measuring the position related data of a mobile station together with information of type of services going on, a cell planning tool and a cellular telecommunication system all further defined in the appended claims.

SHORT DESCRIPTION OF THE FIGURES

DESCRIPTION OF PREFERRED EMBODIMENTS

Figure 1:
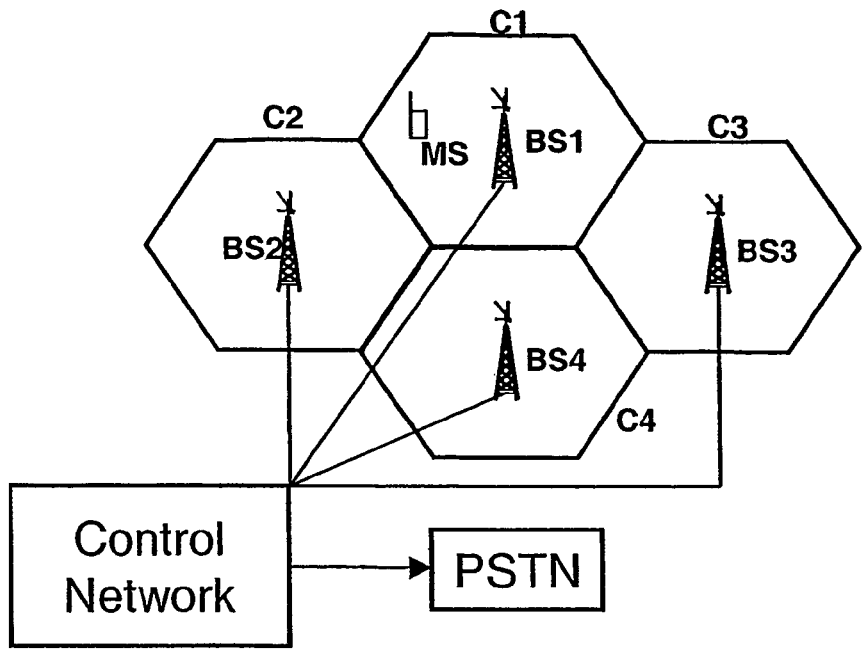
FIG. 1 shows an overview of a mobile telecommunication network in which the invention is used.

In FIG. 1 a mobile communication network of typical design is shown. A control network is connected to a number of base stations—four stations BS1-4 in the example—which base stations have radio connection with mobile stations—only one, MS, shown in the figure—within the various cells C1-4. The control network, e.g. the Base Station Controller, BSC, according to the GSM-standard or the Radio Network Controller, RNC, according to the WCDMA-standard, has communication with the fixed Public Switched Telephone Network, PSTN, and/or the Internet.

To get hold of the position for a mobile station a positioning order has to be sent to the mobile. The positioning method used is e.g. either the standardised OTDOA or A-GPS method or some other method well known in the art. The information about which service that is being used resides in the control network—or some other node of the system—is collected and stored together with the fetched positioning data. The position/service data can alternatively be sent directly from the mobile station to the network when so ordered. That requires that the mobile station knows all the relevant data. The combined service/position data is stored in a database in the control network or in another node.

When enough data have been collected a statistical picture of where different services are used can be displayed and used as input when deciding where a new site shall be built. This picture is the result when practicing the invention and is used in order to build the new site in an optimal position. This will lead to a cost efficient way of cell planning. To refine the picture an optimising algorithm (e.g. least square root) could be used when calculating the most efficient new site position.

Figure 2:
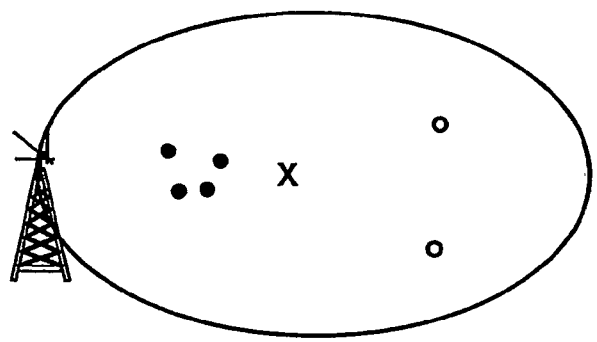
FIGS. 2 and 3 illustrate the traffic distribution within a typical cell.
Figure 3:
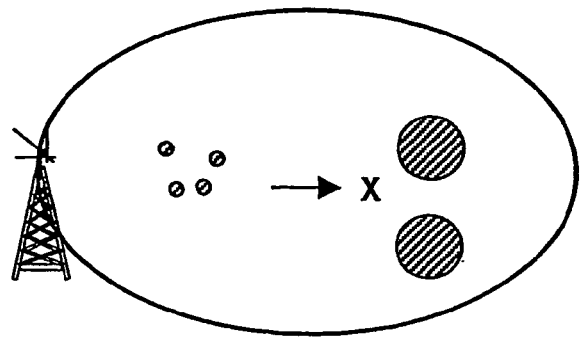

FIG. 2 is an illustrative example of the position of a number of users within a cell. The black dots marks users having an ordinary voice connection with a low bit rate while O marks users having another service such as packet switched data with much higher bit rate. In FIG. 3 the bit rate of the users is taken into account. The four small areas to the left in FIG. 3 mark voice connection with low bit rate. The two packet connection to the right get a much larger area corresponding to the much higher bit rate used. The two FIGS. 2 and 3 shows the need to shift the placing of a new base station, marked X, to the right if not just the position, but also the service used is regarded.

In a further example the path loss is also taken into account. This is illustrated by FIG. 4 and the following table.

| Position (n) | Bit rate (kbps) | Path loss (dB) |
|---|---|---|
| 1 | 12.2 | 130 |
| 2 | 64 | 123 |
| 3 | 12.2 | 123 |
| 4 | 384 | 156 |
| 5 | 384 | 100 |
| 6 | 64 | 112 |
| 7 | 384 | 133 |
| 8 | 12.2 | 124 |
| 9 | 384 | 140 |
| 10 | 12.2 | 135 |
| 11 | 64 | 138 |

Figure 4:
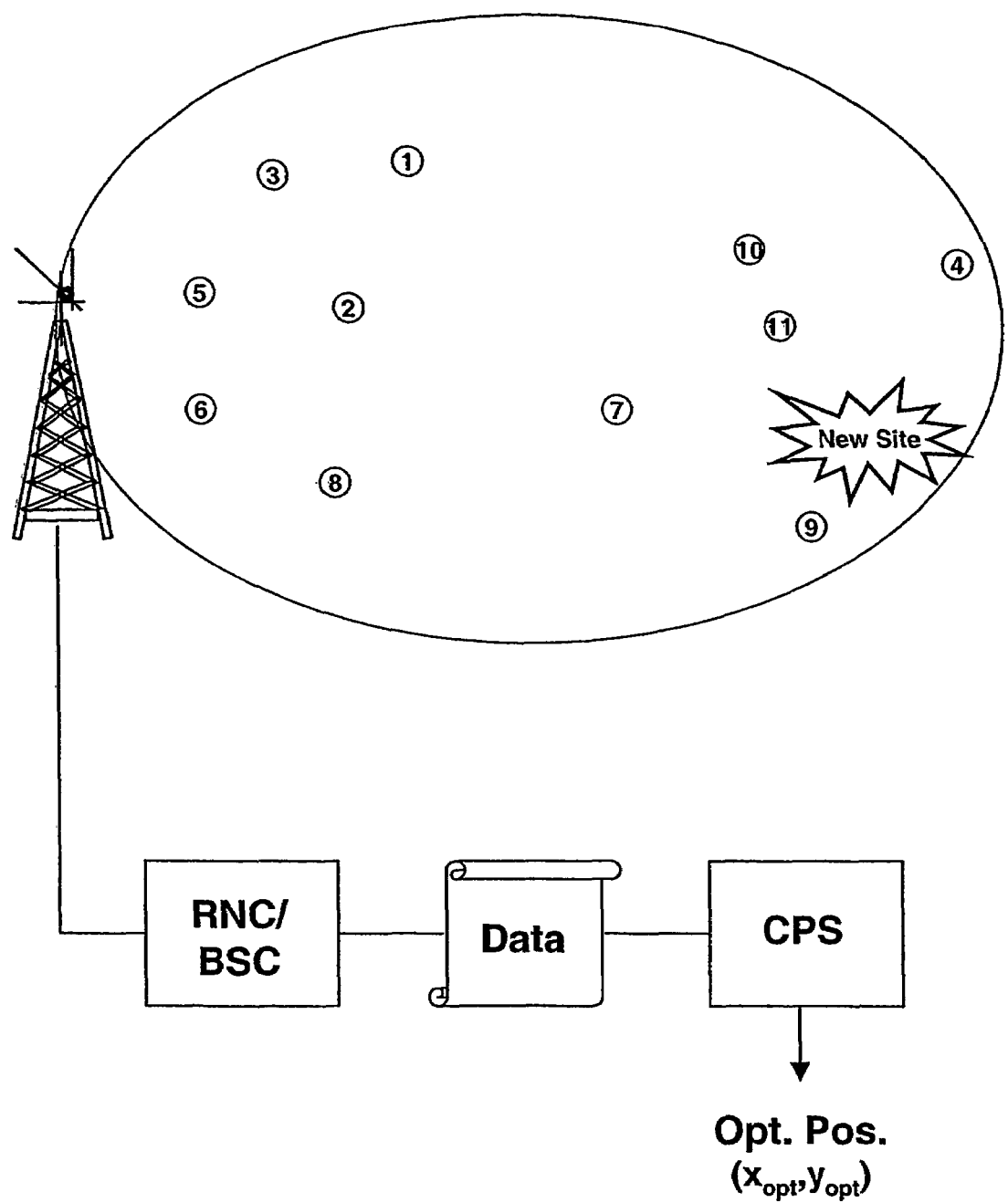
FIG. 4 shows an example of implementation of the invention.

The table shows data from eleven users, position n=1-11, in FIG. 4, used bit rates (BR) and the path loss (PL) in dB of their radio channels. The data from the users in the cell according to FIG. 4 are collected by the RNC/BSC and transferred to a cell planning system node, CPS. The CPS comprises data collecting and calculation equipment in order to perform predictions for potential new site positions using for example Monte Carlo analysis. The optimal position ($x_{opt}$, $y_{opt}$) of a new site is where the maximal bit rate per path loss attenuation is found during the analysis. This is summarised by the following expression:

$$x_{opt}, y_{opt} = \max f(BR_n/PL_n, x_n, y_n)$$

for all mobile users n within the selected area, i.e. the cell of FIG. 4.

Figure 5:
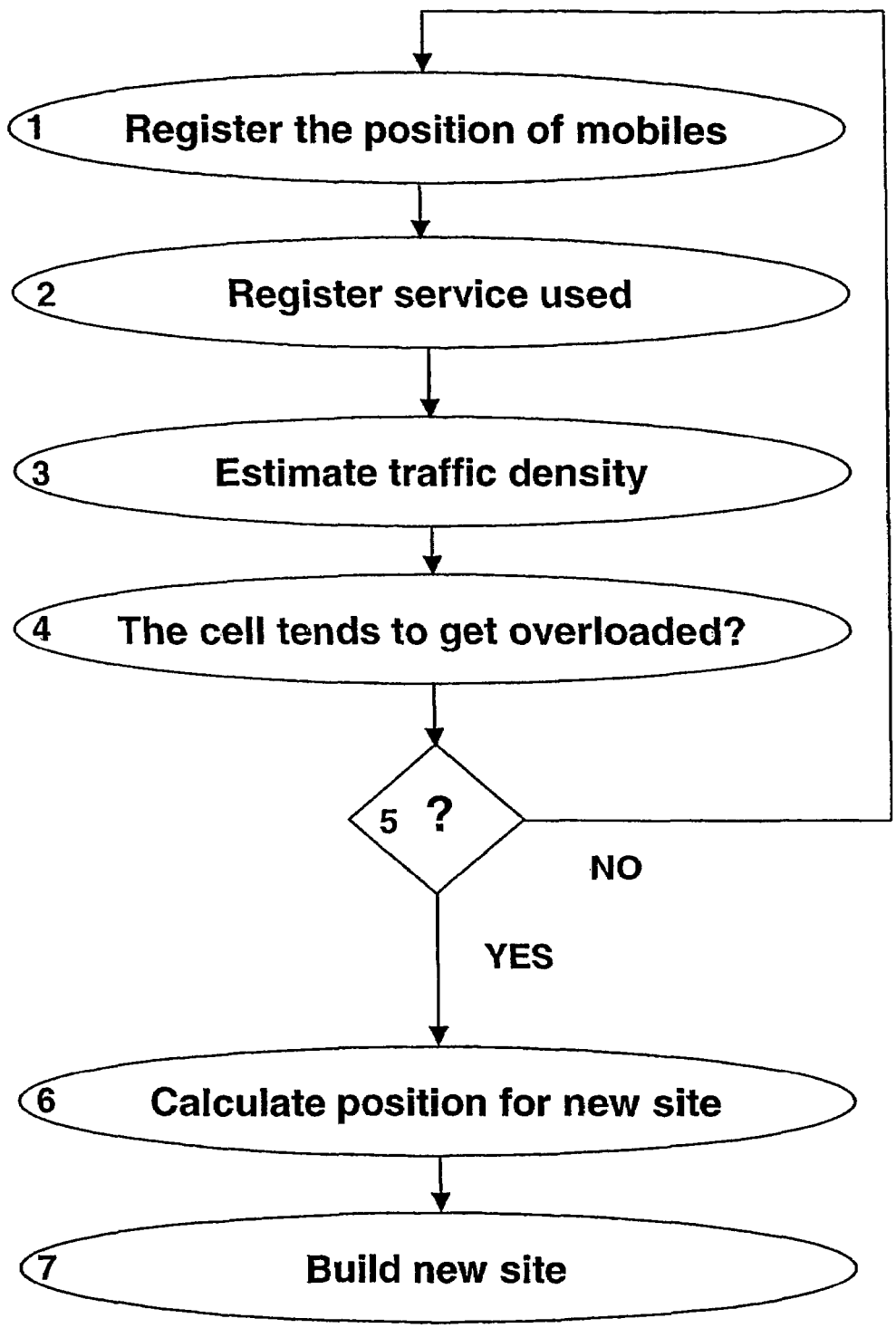
FIG. 5 is a flow chart showing the collection of measurements according to the invention.

The found "new site" is indicated to the right in the figure, which is close to the users 9 and 4 using high bit rate and having a high path loss. The output from CPS may be regarded as a map for personnel building the new site The flow chart of FIG. 5 describes a number of steps for practicing the invention. Step 1 is to find the positions of the mobiles being in a more or less active mode using certain services within a particular cell. In step 2 the system registers the bit rate used by each mobile and optionally also the path losses of the radio channels used. Based on these data a picture of the traffic density is estimated in step 3 and if the cell tends to get congested or overloaded—step 4—and if there are no other means to extend the capacity of the cell a decision YES is taken in step 5 to build a new base station—step 7—in a place based on calculation made in step 6. As long as there is no need for cell split—decision NO of step 5—step 1-4 are repeated at more or less regular intervals. The decision that a cell is overloaded can, of course, be taken on other grounds than the steps according to the flow chart. However, whenever there is a need for a cell split the principles of the invention is used to find the new base station site.

The invention claimed is:

1. A method for cell planning and preparing for a cell split when a cell tends to get congested or overloaded in a cellular mobile telecommunication system, wherein the steps of said method are performed in one or more nodes of said telecommunication system, said method comprising the steps of:
    registering position related data comprising the locations for mobile users (MS) together with what service is used by each user in terms of bit rate;
    creating an estimation of the traffic density within the cell as a function of said position related data; and,
    selecting an optimal site for a new base station as a function of said position related data; and,
    selecting an optimal site for a new base station as function of said position related data or said traffic density;
    wherein maximizing the function $$x_{opt}, y_{opt} = \max f(BR_n/PL_n, x_n, y_n) \text{ for all n}$$

gives the optimal site location for the new base station, where n is an index number for the mobile users of the cell, $BR_n$ is the bit rate used, $PL_n$ is the path loss and $X_n$, $y_n$ is the location of the user n.

2. The method of claim 1, further comprising the step of registering the path losses experienced on the radio channels of the mobiles.

3. The method of claim 2, further comprising the step of generating a map showing the site of the new base station.

4. A cell planning tool for preparing for a cell split in a cellular telecommunication system, comprising:
    a control network for registering the location of mobile stations;
    means for registering the services used by the mobile stations;
    means for, based on the location and service data, estimating the traffic density of the cell; and,
    means for selecting an optimal site for a new base station as a function of said location and service data or said traffic density;
    wherein the optimal site is based on the maximum of the function:

$$x_{opt}, y_{opt} = \max f(BR_n/PL_n, x_n, y_n) \text{ for all n}$$

where n is an index number for the mobile users of the cell, $BR_n$ is the bit rate used, $PL_n$ is the path loss and $X_n$, $y_n$ is the location of the user n.

5. The cell planning tool of claim 4, further comprising means for registering the path losses of the radio channels allocated to the mobile stations.

6. The cell planning tool of claim 4, wherein an optimal location for a new site is established in a cell planning system node.

7. A cellular telecommunication system comprising base stations and mobile stations in communication with each other in a cell under supervision of a control network including a cell planning system node which collects data from the telecommunication system relating to the location of the mobile stations, their path losses on their radio channels and the services they use, and wherein said cell planning system node comprises data collecting and calculation equipment which predicts an optimal place for a new base station as a function of said location, path loss or service data;
    wherein the optimal site is based on the maximum of the function:

$$x_{opt}, y_{opt} = \max f(BR_n/PL_n, x_n, y_n) \text{ for all n}$$

where n is an index number for the mobile users of the cell, $BR_n$ is the bit rate used, $PL_n$ is the path loss and $X_n$, $y_n$ is the location of the user n.

* * * * *

UNITED STATES PATENT AND TRADEMARK OFFICE
CERTIFICATE OF CORRECTION

PATENT NO. : 7,593,734 B2 Page 1 of 1
APPLICATION NO. : 10/556710
DATED : September 22, 2009
INVENTOR(S) : Lidbrink It is certified that error appears in the above-identified patent and that said Letters Patent is hereby corrected as shown below:

In Column 4, Lines 12-13, in Claim 1, delete "selecting an optimal site for a new base station as a function of said position related data; and,".

In Column 4, Line 14, in Claim 1, after "station as" insert -- a --.

In Column 4, Line 20, in Claim 1, delete "$X_n$," and insert -- $x_n$, --, therefor.

In Column 4, Line 42, in Claim 4, delete "$X_n$," and insert -- $x_n$, --, therefor.

In Column 4, Line 64, in Claim 7, delete "$X_n$," and insert -- $x_n$, --, therefor.

Signed and Sealed this

Twelfth Day of January, 2010

David J. Kappos
*Director of the United States Patent and Trademark Office*